H. R. HUGHES.
BORING DRILL.
APPLICATION FILED JULY 15, 1909.
1,010,144.
Patented Nov. 28, 1911.
2 SHEETS—SHEET 1.
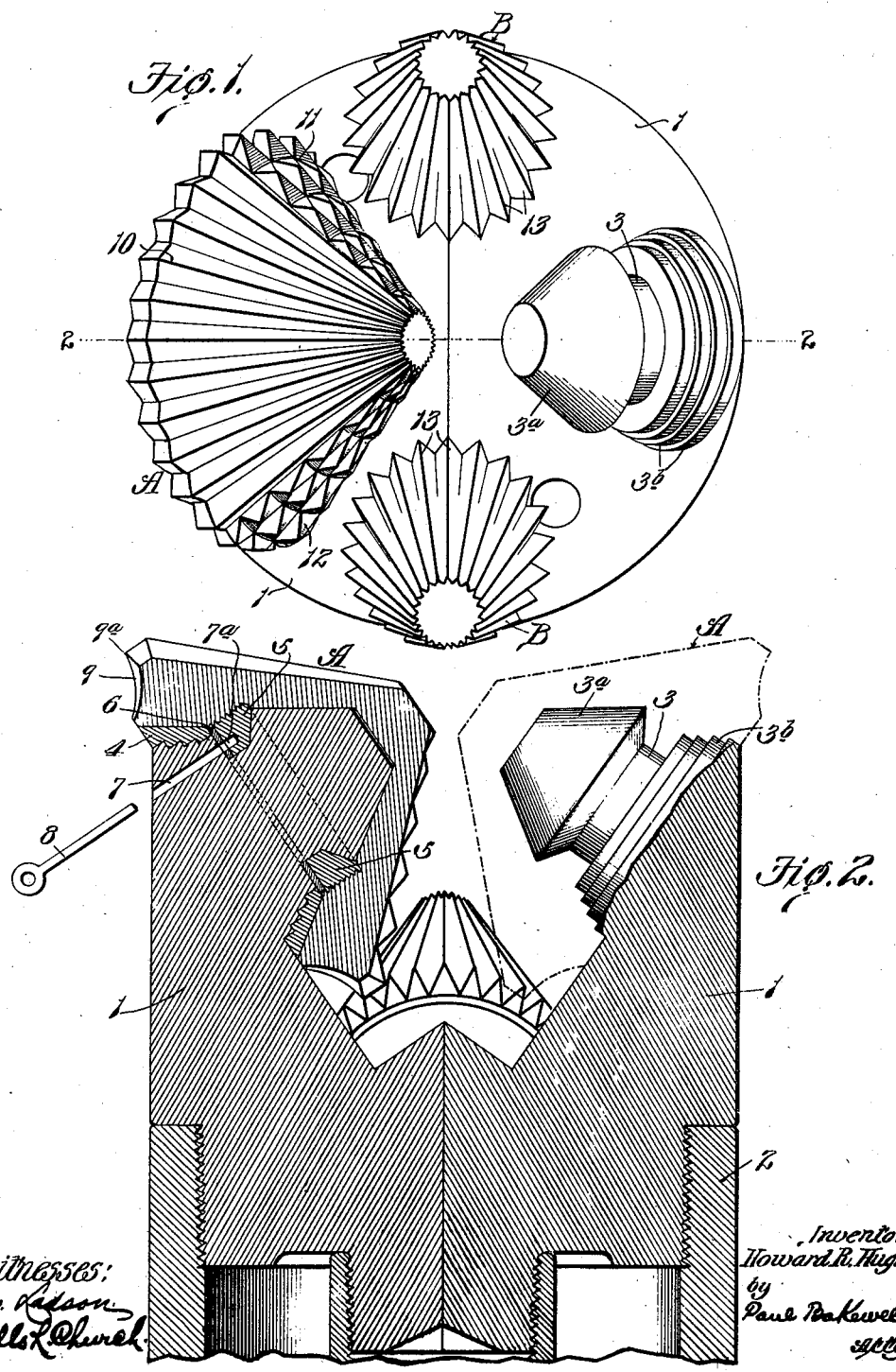
Witnesses:
Inventor:
Howard R. Hughes
by Paul Bakewell
atty.

H. R. HUGHES.
BORING DRILL.
APPLICATION FILED JULY 15, 1909.
1,010,144.
Patented Nov. 28, 1911.
2 SHEETS—SHEET 2.
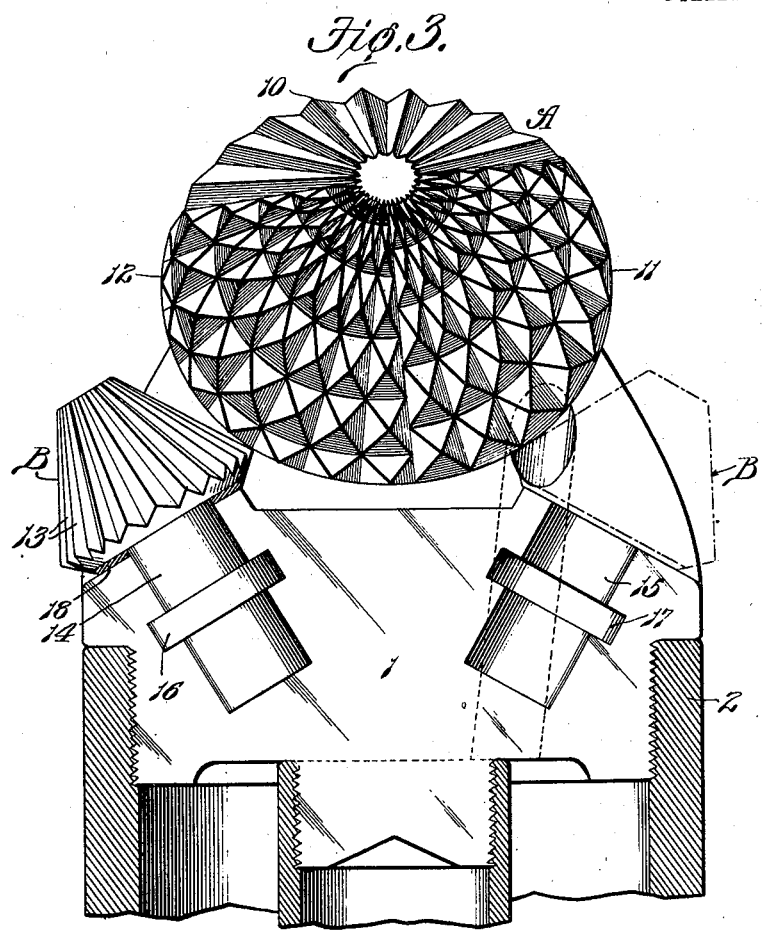
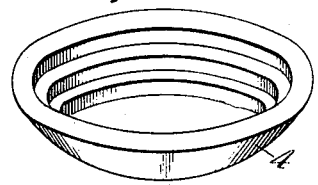
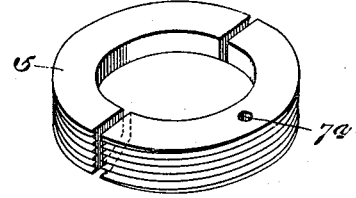
Witnesses:
Inventor
Howard R. Hughes.
by Paul Bakewell
Atty.

UNITED STATES PATENT OFFICE.

HOWARD R. HUGHES, OF HOUSTON, TEXAS.

BORING-DRILL.

1,010,144.   Specification of Letters Patent.   Patented Nov. 28, 1911.

Application filed July 15, 1909. Serial No. 507,678.

*To all whom it may concern:*

Be it known that I, HOWARD R. HUGHES, a citizen of the United States, residing at Houston, Texas, have invented a certain new and useful Improvement in Boring-Drills, of which the following is a full, clear, and exact description, such as will enable others skilled in the art to which it appertains to make and use the same.

This invention relates to boring drills, and particularly to roller drills of the type shown in my U. S. Letters Patent No. 930,759, dated August 10, 1909.

One object of my present invention is to provide a drill of the type referred to in which the head is provided with removable bearing surfaces for the rollers so that said bearing surfaces can be renewed whenever they become worn to such a degree that the rollers will not run true.

Another object of my invention is to provide a drill in which the rollers are retained on the head in a novel manner.

Another object is to provide a drill in which the rollers on the head are so disposed that the head can not wabble or move laterally in the hole being formed. And still another object is to provide a roller that has a cutting surface of novel form.

Other objects and desirable features of my invention will be hereinafter pointed out.

Figure 1 is an end view of a drill constructed in accordance with my present invention, one of the rollers being removed to more clearly illustrate the construction of the spindles which carry the main cutting rollers; Fig. 2 is a vertical sectional view taken on approximately the line 2—2 of Fig. 1; Fig. 3 is a vertical elevational view of one of the members that forms part of the head of the drill; Fig. 4 is a perspective view of one of the removable bearing surfaces on the head; and Fig. 5 is a perspective view of one of the rings that is employed for retaining the rollers on their spindles.

Referring to the drawings which illustrate the preferred form of my present invention, 1 designates a pair of members that form the head of the drill, said members being clamped together by any suitable device, such, for example, as a sleeve 2. While I have herein shown a head that consists of only two members I wish it to be understood that my broad idea is not limited to this exact construction for, if desired, the head could be made up of a different number of members.

In the construction herein shown, a pair of approximately frusto-conical-shaped cutting rollers A are arranged diametrically opposite each other on spindles 3 that project inwardly toward the longitudinal axis of the head, and a second pair of approximately frusto-conical-shaped rollers B are arranged between the rollers A, as shown in Fig. 1, the spindles of the rollers B, however, being inclined oppositely to the spindles of the cutting rollers A.

In the construction illustrated in Fig. 2, the spindles 3 are formed integral with the members 1 that constitute the head, each of said members being provided with one spindle. Each of said spindles has an approximately frusto-conical-shaped end portion $3^a$ and a tapered base portion $3^b$ on which a removable cone-shaped ring 4 is mounted to provide a bearing surface for the roller, the outer face of said ring 4 being of the same angularity as the outer surface of the conical-shaped end portion $3^a$ of the spindle so that the roller A on said spindle will have a true bearing surface to travel on. If desired, the coöperating surfaces of the base portion $3^b$ and the ring 4 can be provided with shoulders that serve to take up the end thrusts to which the roller is subjected. The intermediate portion of the spindle 3 is notched out or grooved, as shown in Fig. 2, so as to receive a locking ring 5 that retains the roller in operative position on the spindle, and if desired, a washer 6 can be arranged between the under side of said locking ring and the upper edge of the member 4 that forms the removable bearing surface for the roller. The locking ring 5 is preferably split or divided so that it can be slipped over the conical-shaped head of the spindle and arranged in the groove in the intermediate portion thereof, and after said locking ring has been arranged in this position the roller A is screwed onto said ring, said ring being provided with external screw-threads, as shown in Fig. 5, that coöperate with internal screw-threads on the roller. Each member 1 of the head is provided with a hole 7, as shown in Fig. 2, into which a pin 8, or other suitable device, can be inserted so as to engage the locking ring 5 and prevent it from rotating when the roller is being screwed onto said ring, said ring being provided with a hole $7^a$ for receiving the inner end of the pin 8. After the roller has been securely connected to the ring 5, the pin 8 is removed so that the locking ring 5 can rotate with the roller. The ring 5 thus forms practically an inwardly projecting flange or rib on the internal bore of the roller that projects into a groove in the spindle so as to prevent the roller from moving longitudinally of the spindle, the spindle being provided with a tapered bearing surface for the roller on each side of the groove in the intermediate portion of the spindle.

In drills of this type the cutting rollers have to be renewed very often owing to the fact that they become dulled and broken, and as the frictional engagement between the rollers and their spindles is very great the spindles are apt to wear away rapidly and unevenly, especially at their inner ends where they are connected to the head. Consequently, when a roller is mounted on a spindle that has worn away unevenly the roller will not run true. One of the most desirable features of the drill herein shown is that it insures a true bearing surface for each roller for if the outer surface of the conical-shaped ring 4 wears unevenly or wears excessively, another ring can be substituted for the worn one and thus produce practically a perfect spindle or bearing surface for the cutting roller.

The rollers A are provided with cutting surfaces that disintegrate the material on the bottom of the hole being formed, and said rollers are also provided with substantially chisel-shaped cutting teeth 9 that shear off the material from the sides of the hole. I prefer to form these chisel-teeth 9 slightly curved or concaved, as shown in Fig. 2, so that when the lower ends 9ª of the teeth wear away there will still be a cutting edge that will shear off the material on the sides of the hole. Preferably, one or both of the rollers A is provided with a cutting surface that consists of a plurality of chisel-teeth 10 and two sets of pyramidal-shaped projections 11 and 12, the projections 11 being staggered relatively to the projections 12, as shown clearly in Fig. 3, so that the material will be finely cut or divided. By providing the roller with a cutting surface of this character I obtain practically the same results as I would from three rollers one of which had chisel-teeth and the others pyramidal-shaped projections.

The rollers B which are arranged between the rollers A are approximately frusto-conical-shaped and are provided with chisel-teeth 13 that shear off the material from the sides of the hole being formed. These rollers B are much smaller than the rollers A, and they are so disposed that they prevent the head of the drill from wabbling or moving laterally in the hole being formed.

The rollers B can be connected to the head in various ways but I prefer to provide each roller with a spindle 14 that fits in a socket 15 formed by coöperating semi-circular-shaped recesses in the meeting faces of the members 1 that constitute the head, said spindle being provided intermediate its ends with a laterally projecting flange 16 that fits in an enlarged portion 17 of the socket 15, as shown in Fig. 3, said flange preventing the spindle from dropping out of its socket. A washer 18 is preferably arranged between the head and the under side of each of the rollers B so as to prevent wear. This manner of connecting the rollers B to the head is very desirable for no separate fastening devices are necessary to retain the rollers in position. In assembling the parts of the drill, the rollers A are first mounted on their spindles in the manner previously described, and the two members 1 of the head are then placed together to embrace the spindles of the rollers B, the members 1 of the head being thereafter clamped together by the sleeve 2 or other suitable device.

Having thus described my invention, what I claim as new and desire to secure by Letters Patent is:

1. A drill comprising a head, a spindle on said head having a groove or reduced portion, a roller rotatably mounted on said spindle, and a locking ring screwed into said roller and projecting into the groove in the spindle so as to retain said roller in position, the head being provided with an opening through which a device can be inserted to hold said locking ring stationary while the roller is being connected to same.

2. In a drill, a spindle having an approximately frusto-conical-shaped end portion, said spindle being provided with a groove and a conical-shaped base portion, a roller mounted on said spindle, and a device on said roller that projects into the groove formed in the spindle.

3. In a drill, a spindle provided intermediate its ends with a groove or recess, a removable member mounted on the base portion of said spindle to act as a bearing surface, a roller mounted on said spindle and surrounding said member, and means on said roller that projects into said groove so as to prevent the roller from moving longitudinally.

4. A drill comprising a head, a pair of approximately frusto-conical-shaped cutting rollers arranged diametrically opposite each other and mounted on spindles that project inwardly toward the longitudinal axis of the head, and a second pair of approximately frusto-conical-shaped cutting rollers arranged between the rollers first referred to and having their spindles projecting outwardly from the longitudinal axis of of the head.

5. A drill comprising a head provided with approximately frusto-conical-shaped cutting rollers that operate on the material in the bottom of the hole being formed, and rollers carried by said head and operating on the sides of the hole being formed to prevent the head from wabbling or moving laterally.

6. A roller boring drill provided with a head having a pair of approximately conical-shaped cutting rollers which are so arranged that they operate on the bottom and partly on the side of the hole being formed, and separate rollers on said head which operate only on the sides of the hole.

7. In a drill, a head provided with a pair of approximately frusto-conical-shaped cutting rollers arranged diametrically opposite each other and having cutting surfaces that operate on the bottom and sides of the hole being formed, and a second pair of approximately frusto-conical-shaped rollers arranged between the rollers first referred to and having cutting surfaces that operate on the sides of the hole being formed.

8. A roller for a boring drill, said roller being of approximately frusto-conical-shape and provided with a cutting surface that is composed of a set of chisel-teeth, and a plurality of sets of pyramidal-shaped projections, the projections of one set being arranged staggered relatively to the projections of the other set.

9. In a drill, an approximately frusto-conical-shaped cutting roller whose inclined surface operates on the bottom of the hole being formed, and teeth on said roller that operate on the sides of the hole being formed, said teeth being slightly concaved.

In testimony whereof I hereunto affix my signature in the presence of two witnesses, this 8th day of July, 1909.

HOWARD R. HUGHES.

Witnesses:
WM. D. BATES,
W. L. THOMAS.